United States Patent [19]

Nakai et al.

[11] Patent Number: 4,572,638
[45] Date of Patent: Feb. 25, 1986

[54] INTERMEDIATE ACCESSORY FOR A CAMERA

[75] Inventors: Masaaki Nakai, Nara; Toshihiko Ishimura, Habikino; Yasuhisa Honda, Sakai, all of Japan

[73] Assignee: Minolta Camera Kabushiki Kaisha, Osaka, Japan

[21] Appl. No.: 597,363

[22] Filed: Apr. 6, 1984

[30] Foreign Application Priority Data

Apr. 8, 1983 [JP] Japan .................................. 58-62779

[51] Int. Cl.$^4$ ............................................. G03B 17/00
[52] U.S. Cl. ................................................... 354/286
[58] Field of Search .................... 354/412, 286, 289.1, 354/400, 289.12

[56] References Cited

U.S. PATENT DOCUMENTS

| | | | |
|---|---|---|---|
| 4,326,788 | 4/1982 | Ohmori et al. | 354/286 |
| 4,329,040 | 5/1982 | Fukino et al. | 354/286 |
| 4,360,255 | 11/1982 | Kawasaki | 354/286 X |
| 4,372,663 | 2/1983 | Oshima | 354/286 |
| 4,477,164 | 10/1984 | Nakai et al. | 354/286 |
| 4,483,603 | 11/1984 | Metabi et al. | 354/286 X |

Primary Examiner—William B. Perkey
Attorney, Agent, or Firm—Watson Cole Grindle & Watson

[57] ABSTRACT

Accessories for use in photographic camera systems provide various data that are inherent to the objective lens being used and are transmitted from the objective lens to the camera body, and the various data are processed and the resultant data are used for automatic exposure control, automatic focusing, and various warnings and indications. Such data may include the maximum and minimum F-numbers, the focal length and the shortest photographable distance of the lens, data indicative of the relationship between the direction of the rotation of a motor within the camera body for automatic focusing and the direction of movement of the lens system, and data indicative of the relationship between the amount of rotation of the motor and the amount of the shifting of the image plane.

9 Claims, 10 Drawing Figures

INTERMEDIATE ACCESSORY FOR A CAMERA

BACKGROUND OF THE INVENTION

1. Field of the Invention

The present invention relates to an intermediate accessory, such as an intermediate lens, a bellows, and a rear converter, which is mounted or interposed between a camera body and an interchangeable lens. More particularly, the invention relates to such an accessory for use in a photographic camera system wherein various data that are inherent to the objective lens being used are transmitted from the objective lens to the camera body, the data are processed and the resultant data are used for automatic exposure control, automatic focusing, and various warnings and indications. The data may include the maximum and minimum F-numbers, the focal length and the shortest photographable distance of the lens, data indicative of the relationship between the direction of the rotation of a motor within a camera body for automatic focusing and the direction of the movement of the lens system, and data indicative of the relationship between the amount of rotation of the motor and the amount of the shifting of the image plane.

2. Description of the Prior Art

Generally, when an intermediate accessory, such as a rear converter, is mounted between an objective lens and a camera body, the minimum F-number and focal length of the entire optical system are determined by the optical parameters of the lens systems of the objective lens and the rear converter. Accordingly, those values of the F-number and focal length may be composite values depending on the configurations of both optical systems and are different from the values for the objective lens without intermediate accessory.

In view of this fact, U.S. Pat. Nos. 4,329,440 and 4,326,788 disclose camera systems wherein an objective lens is provided on its barrel with a signal member at a specific position in the circumferential direction thereof corresponding to the minimum F-number. The camera body is provided with a detection member for detecting the angular position of this signal member to enable transmission of the data of the minimum F-number value from the objective lens to the camera body, and a rear converter to be interposed therebetween is provided within its lens barrel, with a transmitting member which detects the position or location of the signal member of the objective lens, converts the position data to data corresponding to the minimum F-number as the composition of the F-number data of objective lens and rear converter lens system, and transmits the converted data to the detection member of the camera.

This construction enables transmission of correct information suitable for photographing, to the camera body, even when a rear converter is used. On the other hand, a device that makes use of the location of a physical member as described above for transmitting information, requires a large area for the transmission of a single data, resulting in a limitation of the number and kinds of transmissible data by way of the limited area around the mount plane. In addition, since operations or processing of data in the camera body is performed by an electrical circuit based on the data transmitted to the camera, means for converting this mechanically transmitted data into electrical signals is required so that mechanisms the camera mechanisms will be complicated in construction.

Accordingly, in a Japanese patent application which was filed by the assignee of the present application and laid-open with a laid-open No. 54-108628, a camera system is proposed wherein the barrel of an objective lens is provided with a ROM (Read only memory) which stores data inherent to the objective lens in the form of electrical signals and with a device for reading out the data, while the camera body is provided with a microcomputer which reads the data signals from the ROM and performs operations using the data signal.

SUMMARY OF THE INVENTION

An object of the present invention is to provide an intermediate accessory for use in a camera system wherein data inherent to the objective lens is transmitted in the form of electrical signals to a camera body as described in the laid-open patent application with laid-open No. Sho 54-108628.

To attain this object, an intermediate accessory according to the present invention is provided with a data receiving means for receiving the data from an objective lens, operation means for applying prescribed arithmetic operations to the received data and data outputting means for sending out the operated data signals to the camera body. On the other hand, the camera according to the invention is designed to operate in the same way whether an objective lens is mounted on the camera body directly or via the intermediate accessory.

If a pair of terminals are provided for each data in the case when a plurality of data are to be transmitted from the objective lens to the camera, the number of terminals will increase, resulting in the increase of the possibility that the electrical connection between the terminals becomes imperfect to cause malfunction of the system or error in the operation thereof. The same may be said when a digital data signal consisting of a plurality of binary digital signals is to be transmitted.

According to an embodiment of the invention described in detail below, a plurality of digital data signals are serially transmitted through one signal path, and the identification of the kind of the signals and a reading of each signal are performed in synchronization with the clock pulses fed from the camera body. When an intermediate accessory is mounted between the camera-objective lens and the camera body, the same clock pulses are fed at the same time to both the objective lens and the intermediate accessory. In synchronization by means of the clock pulses, the intermediate accessory then selects the data concerning the amount of compensation and the kind of operation for the data read out from the objective lens, receiving, performing arithmetic operation on, and outputing desired data signals. Here the data inherent to the objective lens are stored, for example in the ROM and its addresses are designated in accordance with count of the clock pulses to read out the desired data. In the case of variable data, such as for example, data of focal length of a zoom lens, the addresses may be designated by making use of the output from brushes or photoelectric sensors that move along a code pattern in response to the zoom ring manipulation.

DETAILED DESCRIPTION OF THE PREFFERED EMBODIMENTS

Figure 1:
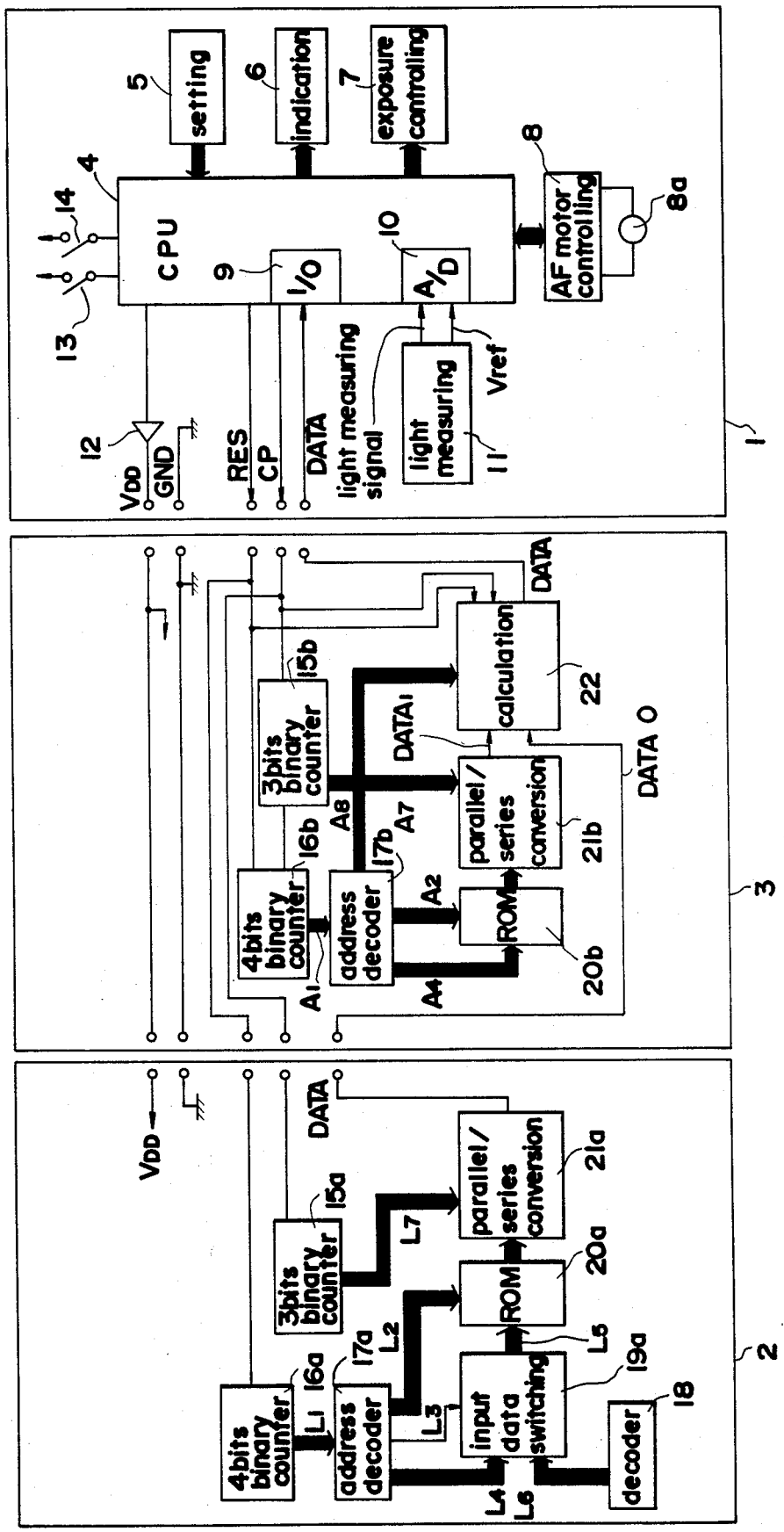
FIG. 1 shows a block diagram showing an intermediate accessory and its related sections according to an embodiment of the present invention.

Before the explanation of the construciton and operation of the embodiment of the invention, an explanation will first be made about the data to be transmitted from an interchangeable lens to the camera body and an arithmetic operation performed in a rear converter as an intermediate accessory. The interchangeable lens of the embodiment outputs a total of nine kinds of data which an imperfect coupling checking code data; a minimum F-number data; a maximum F-number data; a full aperture light-measurement error compensation amount data; a release time lag data; the data of the aperture value at which light for focus detection is partially blocked (partial light blocking aperture data); the data of the rotational direction of an automatic focusing motor (hereinafter called AF motor); adjusting amount conversion coeeficient data for automatic focusing; and focal length data.

The imperfect coupling checking code signal indicates whether an interchangeable lens is correctly mounted on the camera body or not, and the signal is output depending on the status of a switch that is activated when the lens is correctly mounted. The camera reads out the signal first and determined that the camera-objective lens is correctly mounted, for example, when "10101010" is read out, and thereafter performs exposure control operation based on data from the objective lens. When signals other than "10101010" are read to indicate an imperfect or unmatched coupling which means that the camera is coupled with an interchangeable lens non-dedicated to the relevant system, the camera performs an exposure control operation that is not based on data from the camera-objective lens. When a converter is interposed between an interchangebale lens and the camera body, the converter receiving that imperfect connection checking-code signal, will transmit the signal to the camera body after performing an adding operation of +0 (adding 0) on the signal. In other words the data from the interchangebale lens is transmitted to the camera body without being processed or modified. It should be noted that whenever an imperfect or unmatched coupling occurs either between the interchangeable lens and the converter or between the converter and the camera body, signals other than "10101010" indicating the imperfect or unmatched connection will be transmitted to the camera.

The data of minimum F-number and the maximum F-number is stored in the ROM of the interchangeable lens, in the form corresponding to the Av (Av=$\log_2 F^2$) of the minimum F-number (F value when the diaphragm is fully opened) and of the maximum F-number (F value when the diaphragm is stopped-down to the minimum size) of the camera-objective lens based on the apex system. The Av value may be changed by audio of ⅛ Ev. For example, when the minimum F-number is F: 1.68 of which Av is 1+(4/8), data of "00001100" is stored. In the case when maximum F-number is F: 32 of which Av is 10+(0/8), data of "01010000" is stored. When a converter is mounted on the objective lens, their compound F-number will be nF, which means the F value multiplied by n (n is the magnification of the converter), namely, the magnification n of $\log_2 N^2$ is added to the Av value. For example, when a converter lens has a magnification of two, two should be added to the Av values of the minimum and maximum F-numbers. Accordingly, "00010000" will be added to the digital data sent from the objective lens, and then the combined data are sent to the camera body.

The full aperture light measurement error compensation amount data are to compensate for the error in light measurement, which may occur with an interchangeable lens of an unusually large minimum F-number. The data is also stored in terms of ⅛ Ev unit in the ROM of the interchangeable lens as the minimum and maximum F-numbers. When a rear converter is coupled to the objective lens, the amount of compensation should be set to 0, because the position of the entrance pupil will generally move forward. Accordingly, the converter will perform an arithmetic operation converting the full aperture light measurement error compensation amount data to data of "00000000", which is sent out to the camera body.

The partial-light blocking aperture data are information to prevent the occurence of erroneous control and display in such a case when a teleconverter is mounted on a lens with a small mimimum F-number (for example, F: 1.2, and F: 1.4) and the light beam passing through the lens and teleconverter is partially blocked in the range from F: 1.7 to full aperture. If it is assumed that a converter lens having a magnification power of ×2 partially blocks the light beam passing through the objective-lens at the aperture of F: 1.7 to the full aperture, an Av value corresponding to F 1.7×2=F 3.4 will be stored in the ROM of the teleconverter. Also, data corresponding to the Av value that is equal to that of the minimum F-number is also stored in the area of the camera-objective lens where the full aperture partial light blockage data is to be stored. The data that has been sent from the objective lens to the converter lens (in the above discussed case, the data that indicate an aperture value of F: 3.4) may receive an arithmetic operation for being substituted by the data stored in the ROM of the converter lens, and then is sent to the camera body. In the camera body, the dimensions of two values, i.e., the minimum F-number data value and the full aperture light blockage data, are compared, and if the latter is determined to be greater than the former, the camera body performs normal calculation, control and display of exposure using the minimum F-number data. When the minimum F-number is found to be smaller than the full aperture partial light blockage data value, the camera body takes in a diaphragm value corresponding to the full aperture partial light blockage data value as the minimum F-number and then performs subsequent exposure calculation and control.

The release time lag data shows the maximum stopping down time for each objective lens and is equivalent to a period required for stopping the diaphragm from the full to the minimum aperture or the sum of this period and a period required for the diaphragm to be stabilized after its stoppage. The data are stored in terms of millisecond units in the ROM of the objective lens. For example, the maximum stopping down time of 30 milliseconds is expressed as "00011110" while 50 milliseconds as "00110010". When a rear converter is mounted on the camera-objective lens, there is a possibility that the dynamic characteristics of the diaphragm stopping down may deteriorate with resultant prolonged stopping down time. To overcome this problem, a data corresponding to a value obtained by adding data corresponding to, for example 20 milliseconds to the data fed from the objective lens is supplied to the camera body. Namely, the converter adds "00010100" to the data transmitted from the objective lens and sends the resultant data to the camera body.

The AF motor rotational direction data for indicates whether the rotation of the AF motor (a motor provided in the camera body for focus adjustment) in the normal direction causes the focusing lens group of the objective lens driven in the direction to be focused on nearer or longer distance. In other words, in the case of an overall lens system driven type lens, the data will indicate whether the AF motor rotation in the normal direction will shift the lens system forward or rearward. For example, when the rotation of the AF motor in the normal direction, causes the objective lens to move forward, the data of "0000001" will be stored in the ROM of the camera-objective lens while the data "00000000" will be stored in the opposite case. If the motor rotating direction is unchanged even when the rear converter is mounted on the objective lens, a data of "00000000" will be added to the data fed from the objective lens. In the case where the direction of the motor rotation is inverted by the converter, for example, the camera-objective lens which is shifted forward by the rotation of the AF motor in the normal direction, is shifted rearward by the same motor rotation when a certain converter is mounted, data of "0000001" is added to the data fed from the objective lens. The camera body determines the direction of the rotation of the AF motor depending on whether the lowest-ranking bit (LSB) of the received data is "0" or "1".

The lens shifting amount conversion coefficient data is used in the conversion of a defocus amount $\Delta L$ to an amount of AF motor driving in the case where an defocus amount $\Delta L$ and the defocus direction are detected and the focusing of the objective lens is adjusted with the AF motor being driven by an amount corresponding to the detected defocus amount and in the direction depending on the detected defocus direction. The defocus amount $\Delta L$ here means the amount of displacement of an image plane from a predetermined focal plane. The defocus direction indicates whether the image is formed before or after the predetermined focal plane, in other words whether the objective lens is in a front-focus or rear-focus condition. Namely, the lens shifting amount conversion coefficient has a value proportional to $\Delta L/\Delta d$, which is a ratio of the defocus amount $\Delta L$ to the amount $\Delta d$ of the shifting of the lens. In the actual control of the lens, the coefficient data is determined by the ratio between the amount of defocus with respect to the image plane and the pulse coefficient which represents the number of pulses corresponding to the amount of movement of the lens-driving mechanism by the AF motor and which indicates the amount of shifting of the lens for a given amount of rotation of the AF motor in the camera body. The unit of the coefficient is either $\mu m$/pulse or pulse/$\mu m$.

Now, given a focal distance $f$ of the overall optical system and focal distance $f1$ of the optical system for focusing, it is generally known that $\Delta d$ is proportional to $(f1/f)^2 \times \Delta L$, or $\Delta L$ is proportional to $(f/f1)^2 \times \Delta d$.

If the lens shifting amount coefficient is calculated in accordance with the formula $\Delta L \alpha (f/f1)^2 \times \Delta d$ and the absolute value of the calculated value is memorized in the ROM of the objective lens, the lens shifting amount conversion coefficient will be two and four times in the case when a converter lens having magnifying power of $\times 1.4$ or $\times 2$ is attached to the lens, with the focal distance $f$ of the overall optical system becoming 1.4 times or 2 times, respectively. Accordingly, the binary-coded data of the lens shifting amount conversion coefficient fed from the interchangeable lens is sent to the camera body after an arithmetic operations of shifting by 1 bit or 2 bits to the left is given to the data in the converter. Also, the lens shifting amount conversion coefficient is expressed by an exponent with a base of 2 calculated by the formula $\Delta d \alpha (f1/f)^2 \times \Delta L$, and is expressed as a binary number of a total of 8 bits consisting of 4 bits for significant figures and 4 bits for exponent, as shown in Table-1 below.

TABLE 1

| k3 | k2 | K1 | k0 | l3 | l2 | l1 | l0 |
|----|----|----|----|----|----|----|----|
| Significant Figures | | | | Exponent Portion Portion | | | |

From this table and the formula below $$\left( \sum_{n=0}^{3} kn \cdot 2^n \right) \times 2^{\left( \sum_{n=0}^{3} ln \cdot 2^n \right)},$$

it can be derived that when a rear converter having a magnifying power of $\times 1.4$ or $\times 2$ is attached to the objective lens, the AF lens shifting amount conversion coefficient will be ½ times and ¼ times, respectively. Thus the coefficient for the compound optical system can be obtained by subtracting 1 or 2 from the exponent portion. Namely, the data fed from the objective lens will be sent to the camera body after "0000 1111" or "0000 1110" is added thereto in the converter.

Finally the data of the focal length $f$ is used for setting a critical value for the warning of blurr occuring shutter speed or for the determination a diaphragm value for flash photography. In the case of an objective lens with a fixed focal length, the data Fl is expressed in terms of a binary-coded expression of logarithmically compressed value in accordance with an equation of $$Fl = \log_2 \left( \frac{f}{6.25} \right)^8$$

and is stored in the ROM of the objective lens. For example, an interchangeable lens having $f = 50$ mm, 100 mm or 200 mm, the focal length data Fl can be expressed as Fl=24="0001 1000", Fl=32="0010 0000" and Fl=40="0011 1000", respectively. Namely, when the focal length is doubled, the focal length data Fl will increase by 8. When a rear converter with magnifying power of $\times 1.4$ or $\times 2$ is attached to the objective lens, a data obtained by adding "0000 0100" or "0000 1000" to the data fed from the interchangeable lens may be transmitted to the camera body.

Also, in the case when a zoom converter with a magnifying power varying from ×1.4 to ×2 is attached to the objective lens, one of the values between "0000 0100" and "0000 1000" may be added to the data fed from the camera-objective lens, in accordance with the zooming of the zoom converter. The resultant value of the addition will then be sent to the camera body.

As described above, correct data of the composite optical system can be transmitted to the camera body with appropriate values depending on the characteristics of the rear converter attached to the objective lens being added to or substituted by the data fed from the lens or with the fed data being shifted by an appropriate number depending on the characteristics.

Description will now be made about an embodimnet of the invention with reference to the drawings. FIG. 1 shows an embodiment wherein rear converter 3 with a fixed magnification power is interposed between camera body 1 and interchangeable objective lens 2. Camera body 1 is provided with microprocessor 4 which controls the operation of the entire system and is coupled with setting means 5, indication device 6, exposure control means 7, an AF motor control means 8, light measuring circuit 11, etc. In setting means 5, values of photographing conditions, such as a photography mode, a film sensitivity, a shutter speed, and a diaphragm value are manually set and setting means 5 outputs data signals corresponding to those set values. Display device 6 visibly and audibly indicates shutter speed and/or diaphragm value which are to be automatically controlled in accordance with the results of various arithmetic operations performed in microprocessor 4, and indicates the photography mode selected, warning of a blur occuring shutter speed, and whether a infocus condition has been achieved or not. An exposure control means 7 controls the shutter speed and/or diaphragm aperture in response to the exposure control outputs from microprocessor 4. The AF motor control means drives AF motor 8a in response to the focus control output from microprocessor 4. Light measuring circuit 11 measures light from an object to be photographed (object light) in response to the closure of the light measuring switch 13 and generates a light measurement output for the focus adjustment and exposure control. A/D converter 10 converts the analog signal of the light measurement output into a digital signal. I/O port 9 supplies clock pulses to objective lens 2 and converter 3 and also takes in the signals transmitted from objective lens directly or via converter 3. The common terminal is grounded, and terminal VDD supplies power to camera-objective lens 2 and converter 3 via buffer 12.

A 3-bit binary counter 15a and a 4-bit binary counter 16a are provided in objective lens 2. 3-bit binary counter 15a counts the clock pulses fed from the I/O port of microprocessor 4 in camera body 1, 4-bit binary counter 16a counts the pulses that are output by one at every 8 pulses counted by binary counter 15a. The output L1 of 4-bit binary counter 16a is input to address decoder 17a, of which output put of which is divided into two signals; i.e. signal L2, which designates the higher 3 bits of 8 bits designating the address of ROM 20a, and a signal that designates the lower 5 bits. The former signal L2 is directly given to ROM 20a, and the latter signal is given to ROM 20a via input selecting circuit 19a. In the case where a zoom lens is used as objective lens 2, input selection circuit 19a receives the output of decoder 18 which moves relatively to the code plate and reads electrically or optically the code at the position corresponding to a selected zoom ratio. Decoder 18 generates signal L6 for designating the address of the lowerer 5 bits of ROM in accordance with a set zoom ratio or the focal length. Input selection circuit 19a supplies signal L4 or L6 to the ROM 20a in response to selection command signal L3 fed from address decoder 17a. Parallel/series conversion circuit 21a converts the 8-bit data signal from ROM 20a into serial data and outputs the serial data from the data terminal in response to the output from 3-bit binary counter 15a.

Converter 3 is provided with 3-bit binary counter 15b which is the same as 3-bit binary counter 15a of objective lens 2. Converter 3 is further provided with 4-bit binary counter 16b, which has the same construction as 4-bit binary counter 16a, and with address decoder 17b, ROM 20b and parallel/series conversion circuit 21b. The functions and interrelationship of these components in converter 3 are the same as those in the objective lens. With reference to the signals, the signals having the same subscript correspond to each other. In the ROM of camera-objective lens 2, the previously described fixed data to be transmitted to the camera are written at the prescribed address. In the ROM of converter 3, data required for arithmetic operation to be performed on the data fed from the interchangeable lens are written at the prescribed address. Converted 3 is provided therein with calculation circuit 22 which includes, as shown in FIGS. 4, 6, 7 and 8, a serial addition circuit 22a (FIG. 4), substitution circuit 22b (FIG. 6), 1-bit left-shifting circuit 22c (FIG. 7) and 2-bit left-shifting circuit 22d (FIG. 8). These circuits are, for example, by virtue of the circuits shown in FIG. 3, selected by signal A8 from address decoder 17b. Calculation circuit 22 receives data signals from objective lens 2 and data signals required for performing arithmetic operation in the ROM of converter 3, both of which data signals have been individually converted into serial signals, and arithmetic circuit 22 applies predetermined arithmetic operations on those signals.

Figure 3:
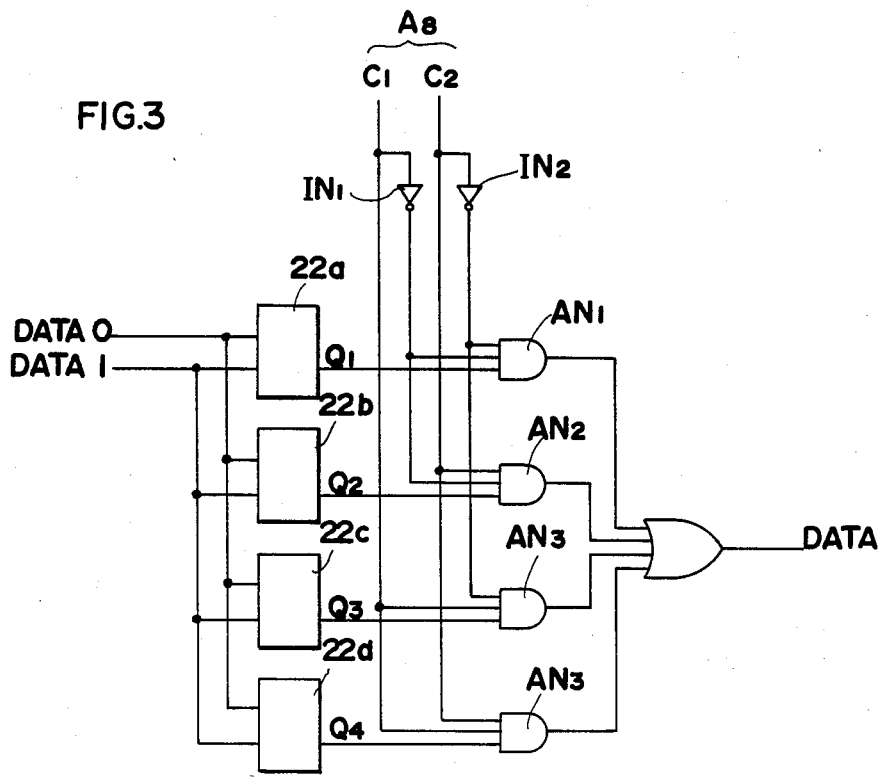
FIG. 3 is a block diagram showing an example of the arithmetic circuit in FIG. 2.

In the circuit of FIG. 3, the data signal DATA 0 from objective lens 2 and data signal DATA 1 from ROM 20b are applied respectively to operation circuits 22a to 22d the outputs of which are fed to OR gate OR1 via the respective AND gates AN1 to AN4. Control signals C1 and C2 fed through line A8 are applied to the input terminals of the AND gates AN1 to AN4 directly or via inverters IN1 and IN2. Thus, as shown in Table 2, one of the outputs of any arithmetic circuit will be selected.

TABLE 2

| Control input signal | | Output signal | |
|---|---|---|---|
| C1 | C2 | D | Gate to be opened |
| 0 | 0 | Q1 | AN1 |
| 0 | 1 | Q2 | AN2 |
| 1 | 0 | Q3 | AN3 |
| 1 | 1 | Q4 | AN4 |

Figure 4:
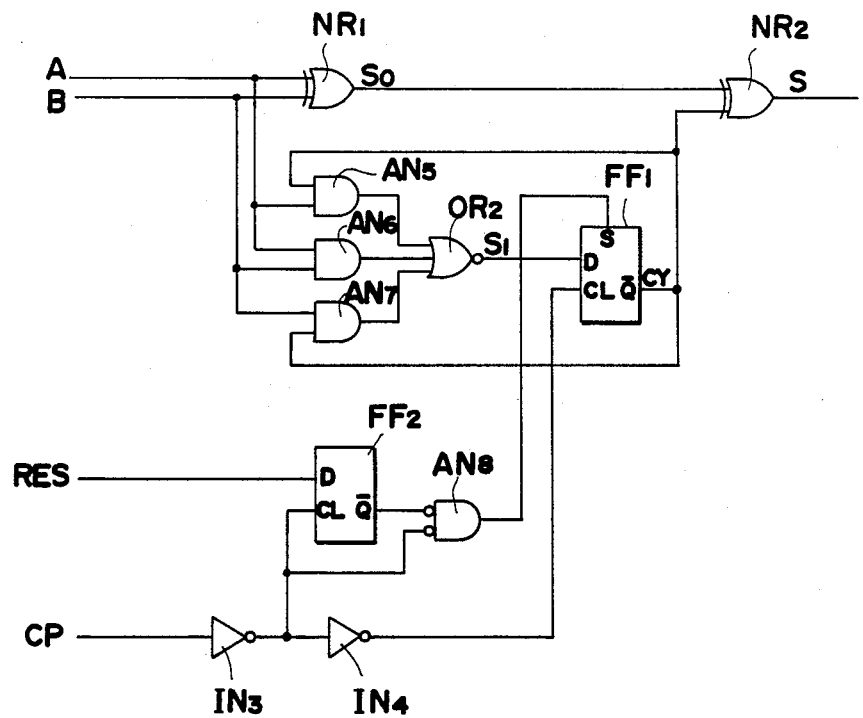
FIG. 4 shows an example of the adder circuit of the embodiment in FIG. 3.
Figure 5:
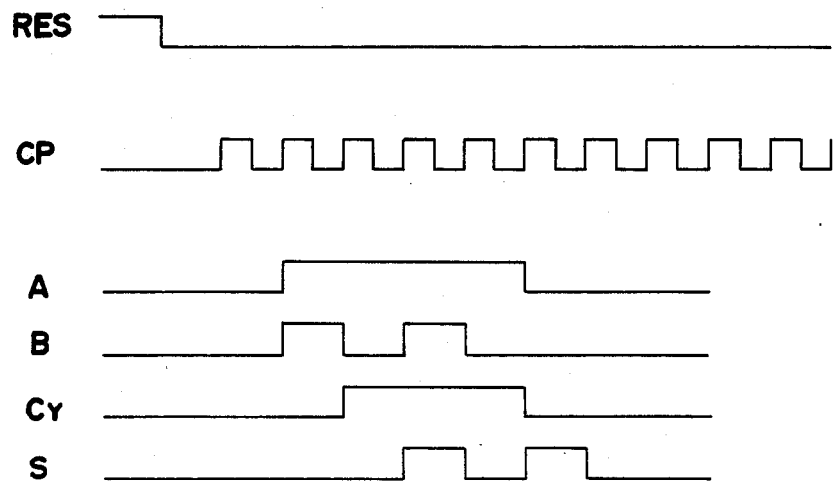
FIG. 5 shows a time chart showing the operation timing of the circuit in FIG. 4.

In the addition circuit in FIG. 4, first, the carry information Cy output from the Q terminal of flipflop FF1 is reset by a reset pulse Res, which is to be input ahead of clock pulse Cp. Next, the two serial data of DATA 0 and DATA1, fed from objective lens 2 and the ROM of converter 3 are sequentially input in synchronization with clock pulse CP, to two input terminals of A and B starting from the lowest-state-bit LSB. The output So of NOR gate NR1 is an exclusive OR of A⊕B. By virtue of NOR gate NR2, an additional exclusive OR of A⊕B⊕Cy will be obtained from A⊕B and a carry data Cy and the result of the logic operation will be output from NOR gate NR2 as a sum S. Carry data output S1 output from OR gate OR2 is delayed for a period of 1 clock pulse by D-type flip-flop FF1 for performing additive operation in the next digit and is output as a carry data Cy. In the embodiment illustrated in FIG. 5, the signal A is "00011110" the signal B is "00001010", the carry signal is "00011100", and the sum signal S is "00101000".

Figure 6:
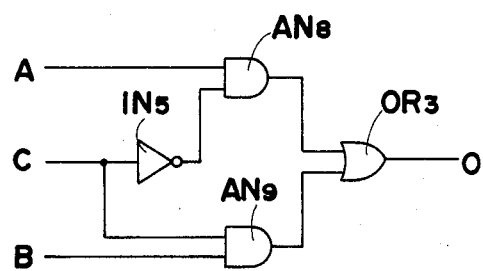
FIG. 6 shows an example of the substitution circuit in FIG. 3.

In the substitution circuit illustrated in FIG. 6, control input signal C is input directly or via inverter IN5 to each terminal of AND gates AN8 and AN9 of which the other terminals receive one of two data inputs A and B so that the signals A will be output from gate OR3 when control input signal C is "0" and the signal B is output when control input signal C is "1".

Figure 7:
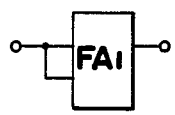
FIGS. 7 and 8 are the block diagrams of the left bit shift circuit in FIG. 3.
Figure 8:
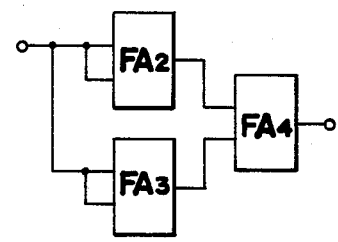

The left bit shifting circuits in FIGS. 7 and 8 comprise one or three 2-input addition circuit (FA) shown by FIG. 4 with the circuit arranged as illustrated. In the 1-bit shifting circuit in FIG. 7, the two input terminals of addition circuit FA1 are connected with each other to have one input, and in the 2-bit shifting circuit in FIG. 8, two addition circuits FA2 and FA3, which have their two input terminals connected with each other, have their input terminals connected to a common input terminal. The outputs of the addition circuits are connected to two inputs of third addition circuit FA4 so that output can be derived from the output terminal of the third addition circuit FA4.

Figure 2:
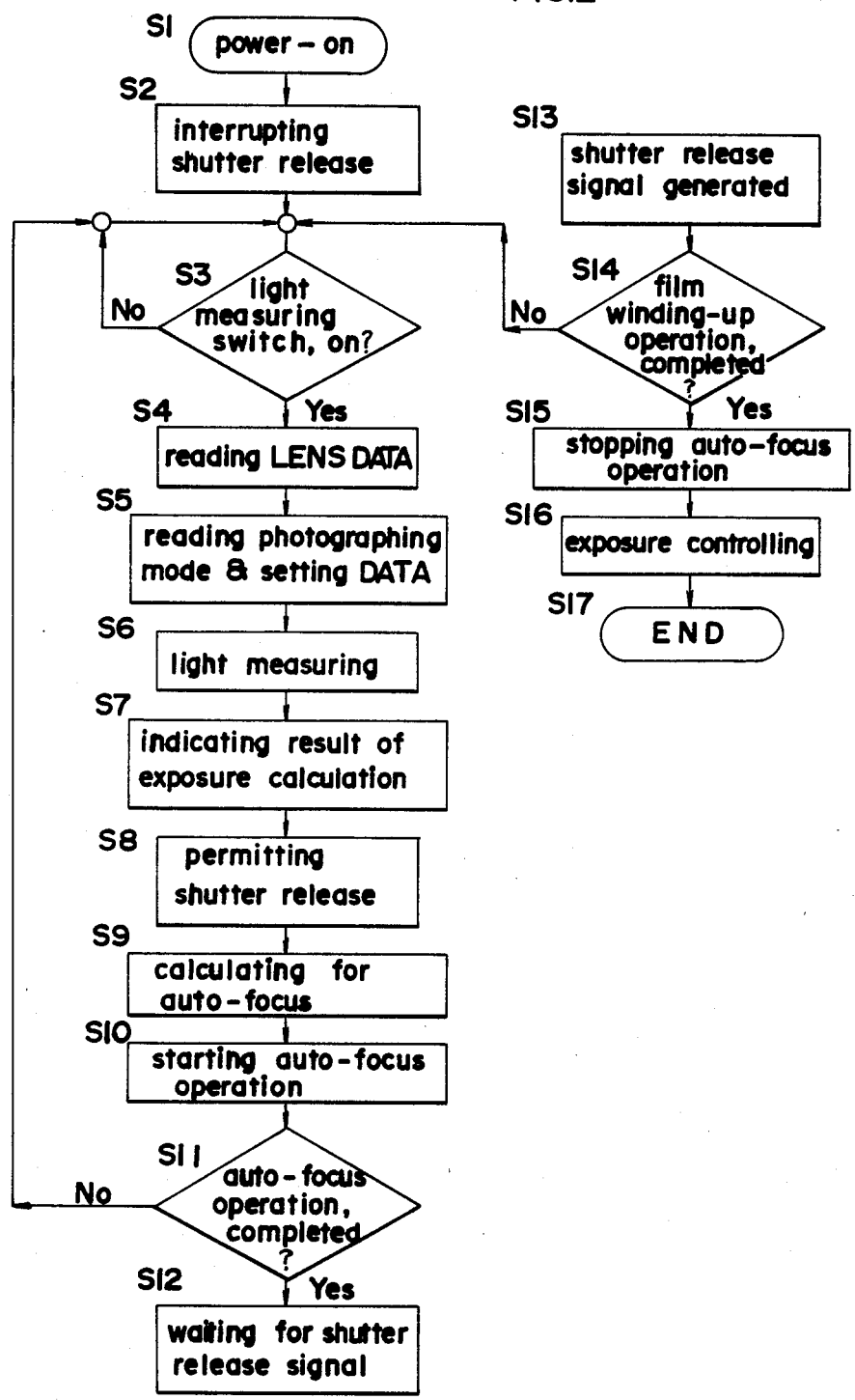
FIG. 2 is a flow chart showing the operational sequence of the camera in FIG. 1.

FIG. 2 shows the operational sequence of the microprocessor illustrated in FIG. 1. The operation of the microprocessor will be described with reference to FIG. 2. When the power supply switch (not shown) of the camera body is turned ON, microprocessor 4 performs initialization. After that, if light measuring switch 13 is turned ON, microprocessor 4 starts the sequence of reading the data from the lens system data. First, power supply voltage VDD starts to be supplied to camera-objective lens 2 and converter 3 via a buffer. Then, the resetting operation of camera-objective lens 2 and converter 3 circuit will be performed by switching reset pulse RES from Low to High. After the reset operation is completed, microprocessor 4 in camera body 1 may start transmission of clock pulses CP from the I/O port. These clock pulses are simultaneously supplied to both camera-objective lens and converter 3. The 3-bit binary counters 15a and 15b of the camera-objective lens 2 and converter 3 produce one pulse at every input of eight clock pulses and supply the pulse to the next state 4-bit binary counters 16a and 16b. 4-bit binary counters 16a and 16b sequentially generate signal L1 or A1 as shown in Table - 3, in response to the pulses fed from 3-bit binary counters 15a and 15b; and supplies those signals L1 and A1 to address decoders 17a and 17b, respectively.

TABLE 3

| Input the order of input pulse | Output L1/A1 |
| --- | --- |
| 1 | 0000 |
| 2 | 0001 |

TABLE 3-continued

| Input the order of input pulse | Output L1/A1 |
| --- | --- |
| 3 | 0010 |
| 4 | 0011 |
| 5 | 0100 |
| 6 | 0101 |
| 7 | 0110 |
| 8 | 0111 |
| 9 | 1000 |

Address decoders 17a and 17b generate signals L2, L4 and A2, A4 for designating the addresses of ROMs 20a and 20b, in accordance with signals L1 and A1 from the 4-bit binary counter. Signals L2 and A2 designate the higher 3 bits of 8-bit addresses of ROMs 20a and 20b, and signals L4 and A4 also designate the lower 5-bits of the same 8-bits address. In addition, when a zoom lens is used as the objective lens, the lower 5-bits of the address of ROM 20a may be designated by means of output L6 of decoder 18 that corresponds to the selected zoom ratio. The selection of the addresse's lower 5-bits designating data L4 and L6 is performed in input selection circuit 19a by means of the output L3 of address decoder 17a. The output L5 of input change-over circuit 19a will therefore designate the address lower-ranking 5-bits.

Tables 4, 5, and 6 shows the relationships between the addresses of the fixed focal length objective lens, zoom objective lens and converter, and the outputs of address decoders 17a and 17b.

TABLE 4

FIXED FOCAL DISTANCE INTERCHANGEABLE LENS

| L1 | Address higher-3-bits L2 | Address lower-5-bits L5 | Content |
| --- | --- | --- | --- |
| 0000 | 000 | 00000 | Imperfect coupling checking code |
| 0001 | 000 | 00001 | Minimum F-number |
| 0010 | 000 | 00010 | Maximum F-number |
| 0011 | 000 | 00011 | Full aperture light measuring error compensation |
| 0100 | 000 | 00100 | Release time lag |
| 0101 | 000 | 00101 | Partial light blocking aperture data |
| 0110 | 000 | 00110 | Rotational direction of AF motor |
| 0111 | 000 | 00111 | AF lens shifting amount conversion coefficient |
| 1000 | 000 | 01000 | Focal length |

TABLE 5

ZOOM INTERCHANGEABLE LENS

| L1 | L3 | Address higher-3-bits L2 | Address lower-5-bits L5 | Content |
| --- | --- | --- | --- | --- |
| 0000 | 0 | 000 | 00000 | Imperfect coupling checking code |
| 0001 | 1 | 000 | ⌀⌀⌀⌀⌀ | Minimum F-number |
| 0010 | 1 | 000 | ⌀⌀⌀⌀⌀ | Maximum F-number |
| 0011 | 0 | 000 | 00011 | Full aperture light measuring error compensation |
| 0100 | 0 | 000 | 00100 | Release time lag |
| 0101 | 0 | 000 | 00101 | Partial light blocking aperture data |
| 0110 | 0 | 000 | 00110 | Rotational direction of AF motor |
| 0111 | 1 | 000 | ⌀⌀⌀⌀⌀ | AF lens shifting amount conversion coefficient |
| 1000 | 1 | 000 | ⌀⌀⌀⌀⌀ | Focal length |

The "⌀" represents either "0" or "1".

TABLE 6
CONVERTER LENS

| A1<br>Address higher-ranking 3-bits | A2<br>Address lower-ranking 5-bits | A4 | Content | Arithmetic operation | C1 | C2 |
|---|---|---|---|---|---|---|
| 0000 | 000 | 00000 | Imperfect coupling checking code | Addition | 0 | 0 |
| 0001 | 000 | 00001 | Minimum F-number | Addition | 0 | 0 |
| 0010 | 000 | 0010 | Maximum F-number | Addition | 0 | 0 |
| 0011 | 000 | 00011 | Full aperture light measuring error compensation | Substitution | 0 | 1 |
| 0100 | 000 | 00100 | Release time lag | Addition | 0 | 0 |
| 0101 | 000 | 00101 | Partial light blocking aperture data | Substitution | 0 | 1 |
| 0110 | 000 | 00110 | Rotational direction of AF motor | Addition | 0 | 0 |
| 0111 | 000 | 00111 | AF lens position shifting amount conversion coefficient | Shifting or addition | 1(0)<br>0 | 1(0)<br>0 |
| 1000 | 000 | 01000 | Focal distance | Addition | 0 | 0 |

ROMs 20a and 20b send 8-bit data at the address designated by signals L2 and L5 or by signals A2 and A4, in the order of L1 and A1 to 8-bit parallel/series conversion circuits 21a and 21b. The 8-bit parallel/series conversion circuits 21a and 21b sequentially convert the 8-bit parallel data, for example, into 8-bit serial data. The control of the timing is made based on the outputs L7 and A7 from 3-bit binary counters 15a and 15b. Table - 7 shows its logic.

TABLE 7

| L7 or A7 | | | Output | | | | | | | |
|---|---|---|---|---|---|---|---|---|---|---|
| 0 | 0 | 0 | 0 | 0 | 0 | 0 | 0 | 0 | 0 | 1 |
| 0 | 0 | 1 | 0 | 0 | 0 | 0 | 0 | 0 | 1 | 0 |
| 0 | 1 | 0 | 0 | 0 | 0 | 0 | 0 | 1 | 0 | 0 |
| 0 | 1 | 1 | 0 | 0 | 0 | 0 | 1 | 0 | 0 | 0 |
| 1 | 0 | 0 | 0 | 0 | 0 | 1 | 0 | 0 | 0 | 0 |
| 1 | 0 | 1 | 0 | 0 | 1 | 0 | 0 | 0 | 0 | 0 |
| 1 | 1 | 0 | 0 | 1 | 0 | 0 | 0 | 0 | 0 | 0 |
| 1 | 1 | 1 | 1 | 0 | 0 | 0 | 0 | 0 | 0 | 0 |
| | | | Highest-bit | | | | | | | Lowest-bit |

In the sequence as described above, DATA0 and DATA1 are input into arithmetic circuit 22 from the ROM 20a of camera-objective lens 2 and ROM 20b of converter 3, respectively. At this stage, ouputs as the result of desired arithmetic operation are selected and output in accordance with operation designating data C1 and C2 output from address decoder 17b, by means of the circuitry as shown in FIG. 3 through FIG. 8.

Next, the operation of the above embodiment will be described with reference to the flow chart of FIG. 2. First, when the power supply switch is turned ON at step S1, the shutter release will be immediately blocked (Step S2). If the light measuring switch has been turned ON at step S3, the camera operation will proceed to step S4. If it has not been turned on, the camera system will wait for the operation of the light measuring switch at that state.

If the light measuring switch has been closed, microprocessor 4 in camera body 1 receives the necessary data from objective lens 2 via converter 3 through the serial I/O port (Step S4). Microprocessor 4 then will read, from setting device 5, binary coded data of the photographing mode, apex values Tv, Av, and Sv of set shutter speed, diaphragm value, and film sensitivity (Step S6) and start light measurement by means of light measuring device 11 (Step S6). A/D converter section 10 receives two input signals of the light measuring output and reference voltage (Vref), and binary quantization will be made to the light measuring output. The exposure calculation will be performed based on the quantized light measurement value, minimum and maximum F-numbers derived from objective lens 2 and converter 3, and full aperture light-measuring error compensation amount, in consideration of the photographing mode derived from setting device 5. The result of the exposure calculation (for example, Av +Tv) are displayed at display device 6 and at the same time is sent to exposure control device 7. At this stage, microprocessor 4 will cancel the prohibition of the interruption by shutter release operation so that the shutter release can be possible (Step S8).

The camera then starts the range-finding or focus detecting operation for automatic focusing and determines the amount and direction of the rotation of the AF motor, basing the result of the focus detection and on the lens shifting amount coefficient derived from the converter, and the AF motor rotating direction data. The result of the determination is sent to AF motor control device 8 (Step S9), which controls the shifting of the lens in accordance with the input data (Step S10).

When the automatic focusing operation is completed at step S11, the camera will proceed to step S12, where it waits for interruption by shutter release operation and proceeds to interruption processing process. If the release operation is made before the automatic focusing operation is completed, the camera will proceed to step S13 for interruption processing. At this time, if the film advancing has been completed at Step S14, the camera will stop its automatic focusing operation at step S15, and will then proceed to the exposure control operation of step S16.

Exposure control device 7 controls the camera photographing operation, including shutter speed and diaphragm control in accordance with the previously obtained result of the exposure calculation and the release time lag data, which was input from objective lens 2 and converter 3, and a cycle of camera-operation will then be completed.

Figure 9:
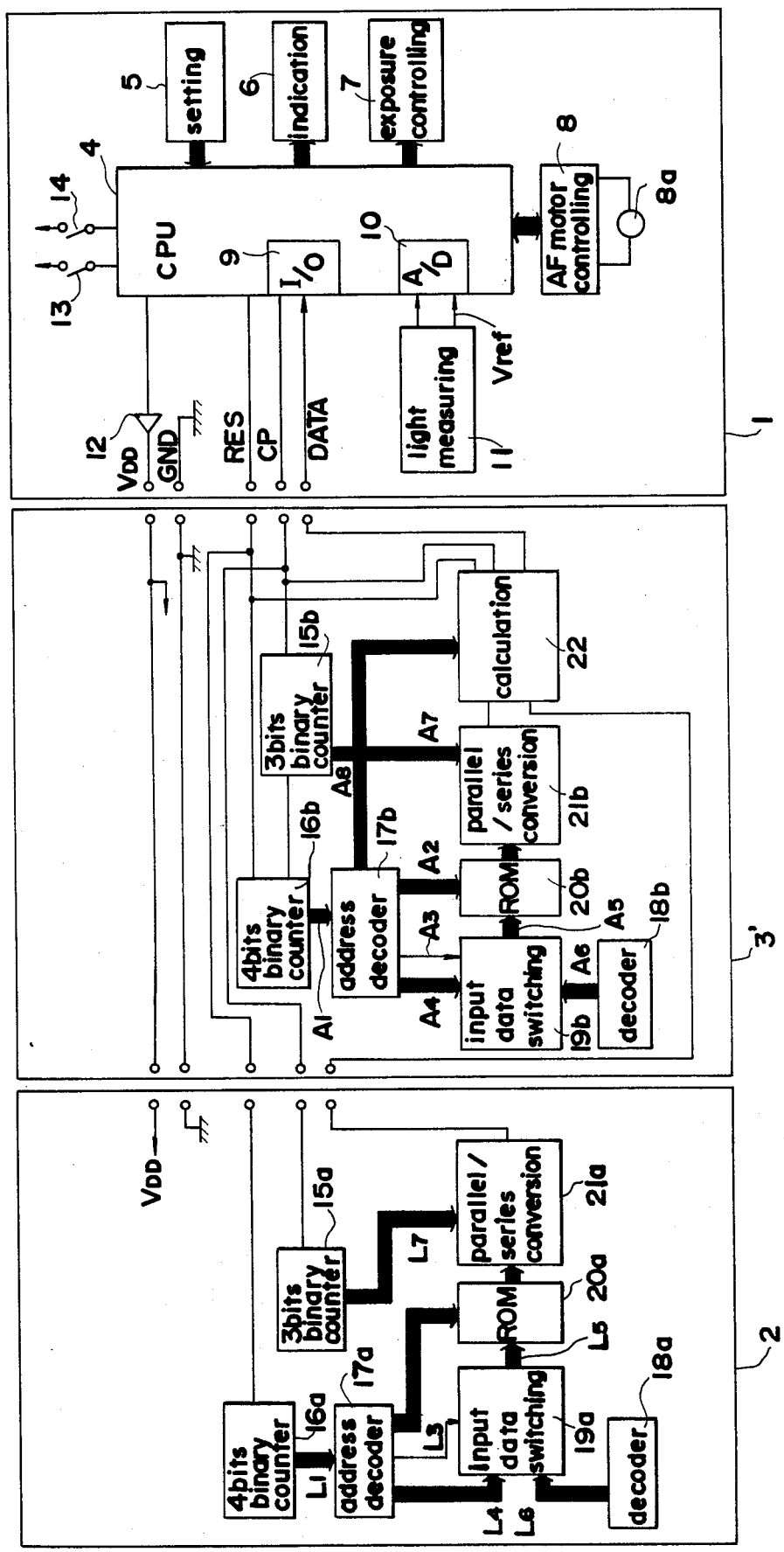
FIG. 9 is a block diagram of an intermediate accessory and its related sections of another embodiment.

Next description is made about the case in which magnification variable zoom converter 3' is mounted between objective lens 2 and camera body 1. FIG. 9 shows the block diagram of its circuit. In FIG. 9, the same numbers are given to the units and control signals that performs the same functions as those in FIG. 1 and their descriptions are omitted. The role of zoom converter 3' will be carried out if it performs arithmetic conversion of the data fed from an objective lens in accordance with the set zoom ratio (magnifying power) of the zoom converter lens and sends the result to the camera body. The zoom converter, however, can not add a fixed value to the received data, since the data to be added or substituted may vary in response to the zooming. Therefore, a decoder should be used which consists, for example, of a code plate and an electrical or optical code read device which is movable relative to the code plate utilized. And further, a decoder 18b, which outputs address signal A6 having a value corresponding to the zoom ratio of the zoom converter lens, is provided in zoom converter 3' to enable outputting of a value in the data table previously set in ROM 20b. The logic table corresponding to Table - 6 is shown in Table - 8. The selection of the lower 5-bit address designating data A4 and A6 is performed in input selection circuit 19b by means of decoder 17b output A3.

The output A5 of input selection circuit 19b will designate the lower 5-bits of the address of ROM 20b.

TABLE 8

| | | ZOOM CONVERTER LENS | | | |
|---|---|---|---|---|---|
| A1 | A3 | Higher 3-bits of address A2 | Lower 5-bits of address A4 | Content | Arithmetic operation |
| 0000 | 0 | 000 | 00000 | Imperfect coupling checking code | Addition |
| 0001 | 1 | 001 | ∅∅∅∅∅ | Minimum F-number | Addition |
| 0010 | 1 | 010 | ∅∅∅∅∅ | Maximum F-number | Addition |
| 0011 | 0 | 000 | 00011 | Full aperture light measuring error compensation | Substitution |
| 0100 | 0 | 000 | 00100 | Release time lag | Addition |
| 0101 | 0 | 000 | 00101 | Partial light blocking aperture data | Substitution |
| 0110 | 0 | 000 | 00110 | AF motor rotating direction | Addition |
| 0111 | 1 | 011 | ∅∅∅∅∅ | AF lens position shifting conversion coefficient | Shifting or addition |
| 1000 | 1 | 100 | ∅∅∅∅∅ | Focal length | Addition |

The "∅" represents either "0" or "1".

The camera operating sequence is the same as the previously described sequence described with reference to FIG. 2. With regard to the minimum and maximum F-numbers, lens shifting amount conversion coefficient, and focal length, however, arithmetic operation will be performed on the data fed from the camera-objective lens for obtaining appropriate values in compliance with the zoom ratio of the zoom converter. These calculated values will then be sent to the camera body.

Next, another embodiment using a magnification variable zoom converter is described.

The circuit configuration may well be the same as that in FIG. 9. The AF lens shifting amount conversion coefficient magnification shall be set in ROMs 20a and 20b in addition to the previously described nine kinds of data. The "1" shall be assigned for the magnifying power of objective lens 2. The varying ratio of the AF lens shifting amount conversion coefficient that varies in response to zooming shall be stored as an AF lens shifting amount conversion magnifying power of the zoom converter. When a zoom converter is attached to an objective lens, the AF lens shifting amount conversion coefficient fed from the objective lens will be sent to the camera body without being modified, i.e., "00000000" being added.

Figure 10:
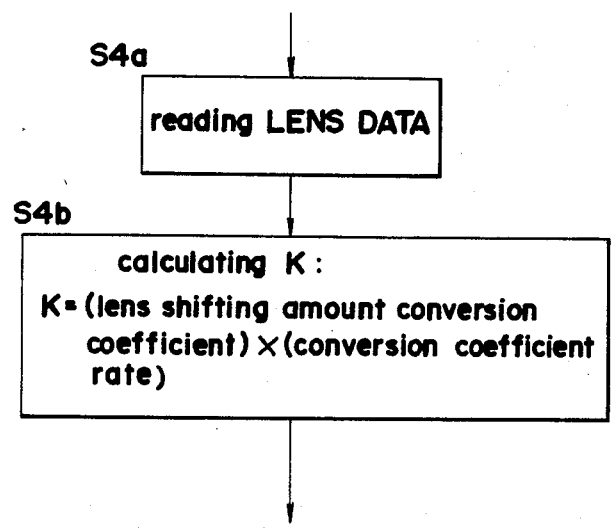
FIG. 10 is a flow chart related to the operations executed by the system in FIG. 9.

Next, the AF lens shifting amount conversion coefficient magnifying power (namely, "1") sent form the objective lens will be transmitted to the camera body after an arithmetic operation has been performed to substitute by a numerical value corresponding to the zooming of the zoom converter (Step S4a in FIG. 10). The camera body performs the AF motor driving control based on the value K, which can be obtained by multiplying the two data received together, namely, the AF lens conversion amount coefficient multiplied by the AF lens position shifting amount coefficient magnifying power (Step S4b).

The operation sequence at this time is shown in FIG. 10. Note that FIG. 10 illustrates only "lens data reading" shown at step S4 in FIG. 4. The rest of the operating sequences are totally in common with those shown in FIG. 2. Also, logic diagrams for the objective lens and the zoom converter are shown in Tables 9 and 10.

In these diagrams, the objective lens used is a zoom lens.

TABLE 9

| | | ZOOM LENS | | |
|---|---|---|---|---|
| L1 | L3 | Higher 3-bits of address L2 | Lower 5-bits of address L5 | Content |
| 0000 | 0 | 000 | 00000 | Imperfect coupling checking code |
| 0001 | 1 | 001 | ∅∅∅∅∅ | Full aperture F value, minimum F-number |
| 0010 | 1 | 010 | ∅∅∅∅∅ | Minimum F value, maximum F-number |
| 0011 | 0 | 000 | 00011 | Full aperture light measuring error compensation |
| 0100 | 0 | 000 | 00100 | Release time lag |
| 0101 | 0 | 000 | 00101 | Partial light blocking aperture |
| 0110 | 0 | 000 | 00110 | AF motor rotating direction |
| 0111 | 1 | 011 | ∅∅∅∅∅ | AF lens shifting amount conversion coefficient |
| 1000 | 0 | 000 | 00111 | AF lens shifting amount conversion coefficient magnifying power (1) |
| 1001 | 1 | 1000 | ∅∅∅∅∅ | Focal length |

TABLE 10

| | | ZOOM CONVERTER | | | |
|---|---|---|---|---|---|
| A1 | A3 | Address higher-state 3-bits A2 | Address lower-state 5-bits A5 | Information content | Arithmetic operation |
| 0000 | 0 | 000 | 00000 | Imperfect coupling checking code | Addition |
| 0000 | 1 | 001 | ∅∅∅∅∅ | Full aperture F value, minimum F-number | Addition |
| 0010 | 1 | 010 | ∅∅∅∅∅ | Minimum F value, maximum F-number | Addition |
| 0011 | 0 | 000 | 00011 | Full aperture light measuring error compensation | Substitution |
| 0100 | 0 | 000 | 00100 | Release time lag | Addition |
| 0101 | 0 | 000 | 00101 | Partial light blocking aperture | Addition |
| 0110 | 0 | 000 | 00110 | AF motor rotating direction | Addition |
| 0111 | 0 | 000 | 00111 | AF motor shifting amount conversion coefficient | Addition |
| 1000 | 1 | 001 | ∅∅∅∅∅ | AF motor shifting conversion coefficient magnifying power | Substitution |
| 1001 | 1 | 100 | ∅∅∅∅∅ | Focal length | Addition |

As described above, the use of an intermediate accessory in accordance with the present invention will always permit a camera body to receive correct data and to perform the desired control operation even when any type of optical system is mounted in combination with an interchangeable lens and an intermediate accessory. Note that although the foregoing explanation specifically applies to cases where a converter is used in accordance with this invention, the same concept also applies when an intermediate ring and a bellows are used with the invention.

What is claimed is:

1. In a photographic lens system having an interchangeable lens with a lens mount and a camera body with a body mount engageable with said lens mount, said camera body receiving plural kinds of information from the lens mounted on said body mount, said plural kinds of information being in accordance with the characteristics of said lens, an intermediate accessory mountable between said lens and said camera body, comprising:

a first mount engageable with said lens mount, a second mount engageable with said body mount, means for receiving plural kinds of information from the leng engaged with said first mount in turn to produce a plurality of data signals each respectively representing each kind of information, means for calculating with said plurality of data signals to produce a plurality of information signals each respectively representing both the characteristic of said lens and the characteristics of said accessory, said calculation being determined in accordance with the kinds of information, and means for transmitting said plurality of information signals to said camera body engaged with said second mount.

2. An intermediate accessory as claimed in claim 1, wherein said plural kinds of information are formed as a plurality of digital signals, said receiving means serially receives said plurality of digital signals, said calculation means calculates serially, and said transmitting means transmits the plurality of information signals serially as digital signals.

3. An intermediate accessory as claimed in claim 1, wherein said calculation means includes means for producing characteristic signals in accordance with the kinds of information received by said receiving means, said intermediate accessory further comprising means for selecting between said characteristic signals and said information signals in accordance with the kinds of information received by said receiving means.

4. An intermediate accessory as claimed in claim 3, wherein said calculation means includes means for adding a predetermined value to said data signals.

5. An intermediate accessory as claimed in claim 3, wherein said calculation means includes means for substituting said characteristic signals for said data signal.

6. An intermediate accessory as claimed in claim 3, wherein said plural kinds of information are formed as plurality of digital signals, and wherein said calculating means includes means for shifting said digital signals.

7. An intermediate accessory as claimed in claim 1, wherein said intermediate accessory is a rear converter including at least an optical element.

8. An intermediate accessory as claimed in claim 1, wherein said intermediate accessory is an intermediate ring.

9. An intermediate accessory as claimed in claim 1, wherein said intermediate accessory is a bellows.

* * * * *